United States Patent [19]
Conklin et al.

[11] 4,128,912
[45] Dec. 12, 1978

[54] GARDEN TRAY WITH PIVOTED HANDLE

[76] Inventors: Harold E. Conklin; George Spector, both of 3615 Woolworth Bldg., 233 Broadway, New York, N.Y. 10007

[21] Appl. No.: 691,998

[22] Filed: Jun. 2, 1976

[51] Int. Cl.² .............................................. A47L 13/52
[52] U.S. Cl. .................................. 15/257.7; 15/257.8
[58] Field of Search ............................ 15/257.1–257.9; 248/463, 150

[56] References Cited
U.S. PATENT DOCUMENTS

| 162,524 | 4/1875 | Bliss | 15/257.8 |
| 510,762 | 12/1893 | Barber | 15/257.5 |
| 538,712 | 5/1895 | Stuart | 248/463 X |
| 565,059 | 8/1896 | Williams | 15/257.5 |
| 1,461,624 | 7/1923 | Lewis | 15/257.5 |
| 1,709,928 | 4/1929 | Whitney | 100/18 |
| 3,121,248 | 2/1964 | Ferguson | 15/257.9 |

*Primary Examiner*—Daniel Blum

[57] ABSTRACT

A novel tray for use in a garden or on a lawn, and which serves for picking up trash, lawn weeds and the like; the tray being in the general shape of a conventional dust pan and made of plastic material; the tray consisting of a flat rectangular bottom wall having upstanding walls on three sides while the fourth side forms a straight edge over which the various trash or the like can be scooped up. A pivoted handle having spurs is provided on the bottom of the tray.

2 Claims, 5 Drawing Figures

U.S. Patent
Dec. 12, 1978
4,128,912
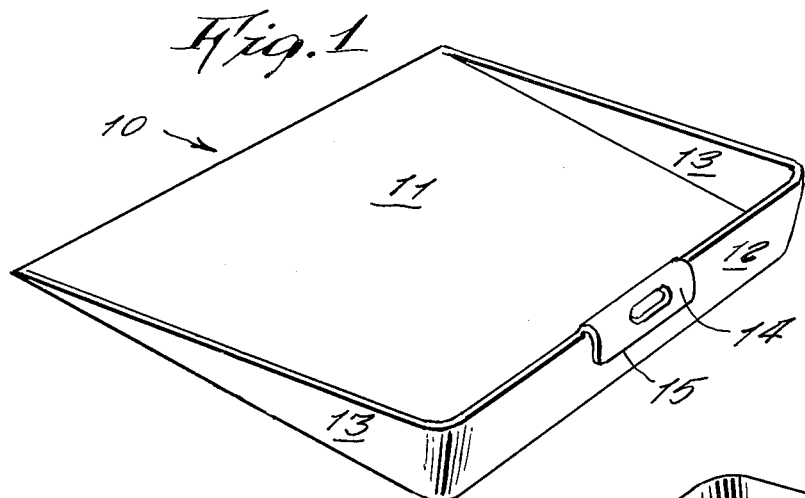
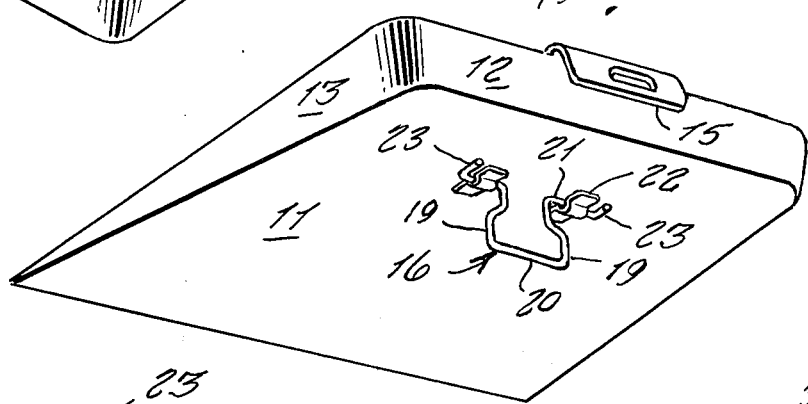
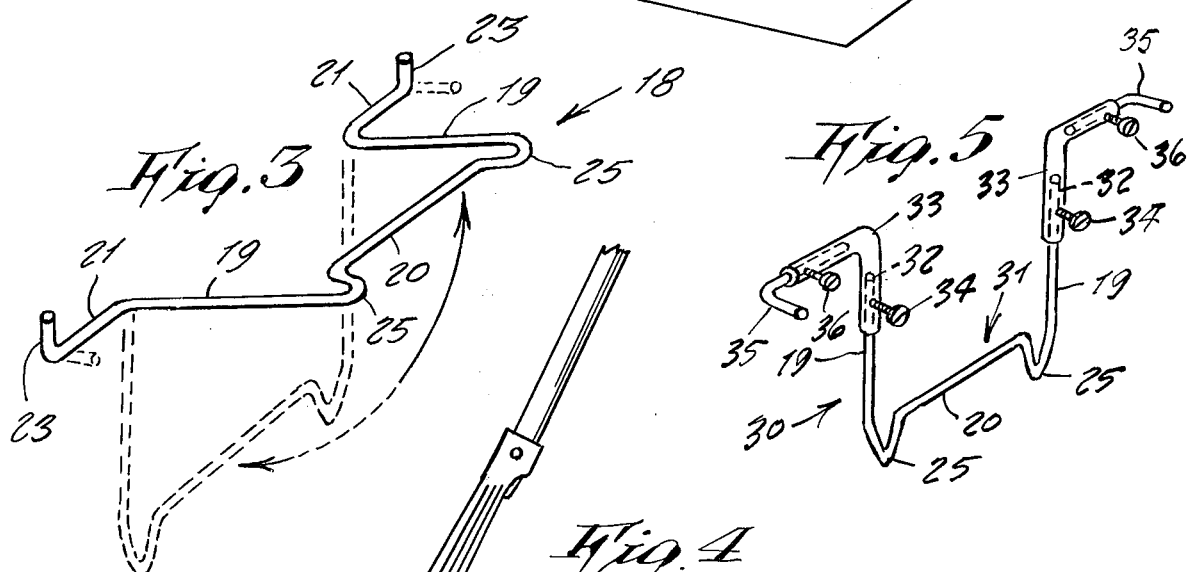
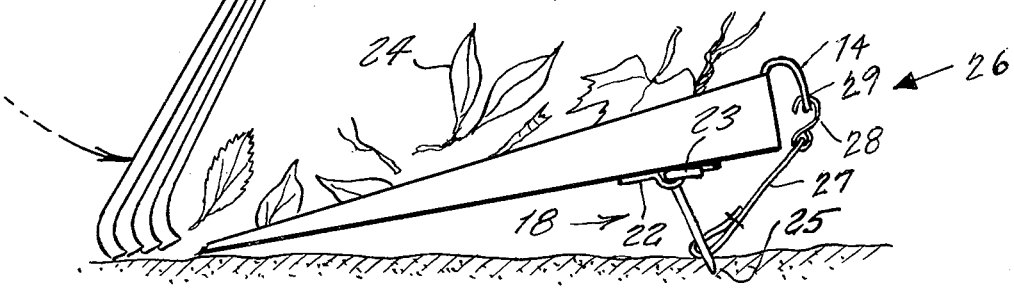

GARDEN TRAY WITH PIVOTED HANDLE

This invention relates generally to gardening tools and equipment.

A principal object of the present invention is to provide a novel tray that is designed particularly for use out-of-doors when working on a lawn or in a garden, and which serves for picking up trash, clippings, leaves, twigs or pulled out weeds.

Another object is to provide a garden big helper tray which alternately can be used to carry vegetables and fruits that are gathered in a garden or orchard and bring them into a house.

Still another object is to provide a garden big helper tray which is of size so that it fits to drop trash therefrom directly into a trash can without spilling over the trash can sides.

Other objects are to provide a garden big helper tray which is simple in design, inexpensive to manufacture, rugged in construction, easy to use and efficient in operation.

These and other objects will be readily evident upon a study of the following specification and the accompanying drawing wherein:

FIG. 1 is a top perspective view of a tray the invention.

FIG. 2 is a bottom perspective view thereof, and showing a handle that limits the pivotal swing thereof, so that the handle forms a leg for holding the tray in an inclined position when placed upon a ground so a person does not need to remain in a bent over position when sweeping trash upon it.

FIG. 3 is a perspective view of a modified and a preferred form of the handle from that shown in FIG. 2; the present modified design including extending legs at each end that limit the pivotal swing of the handle so that the handle forms a leg for holding the tray in an inclined position when placed upon a ground so a person does not need to remain in a bent over position when sweeping trash upon it; the handle also including spurs formed at each end to pierce into the ground so to prevent the tray from sliding backward while trash is being swept upon it.

FIG. 4 is a side view of the modified designed tray shown in operating position, as described in FIG. 3.

FIG. 5 is a perspective view of another preferred modification.

Referring now to the drawing in detail, and more particularly to FIGS. 1 and 2 at this time, the reference numeral 10 represents a garden big helper tray wherein the same is molded in one piece from plastic material, and which includes a rectangular flat bottom wall 11 bounded on its rear edge by an upstanding vertical back wall 12, and bounded on opposite side edges by triangular upstanding side walls 13. A rolled over tab 14 on an upper edge of the back wall serves as a convenient handle 15. Upon an underside of the bottom wall 11 there is mounted a pivotable, generally U-shaped handle 16.

In operative use, it is now evident that handle 15 can be used while scooping up trash into the tray, and handle 16 can be used when carrying the tray while transporting the same.

The tray 10 preferably is 20 inches in length, 17 inches in width and 2½ inches high at its rear.

The handle 16 is made of stiff metal wire and includes a generally U-shaped bail consisting of parallel, spaced apart side legs 19 interconnected by leg 20 that is grasped in a person's hand in use. A straight extension 21 is at the end of each side leg 19 for pivoting in a bearing formed by strap 22 secured to the underside of the bottom wall: the extensions 21 accordingly being on a common axis. A terminal projection 23 is on the end of each extension 21, the projections being at right angle thereto and serving as stops for abutting against the bottom wall underside so to limit the pivotal travel of the handle in order that it can be set up into the position shown in FIG. 4, whereby the tray is slightly tilted with the front edge hard down so raking of trash 24 thereupon can be done.

Reference is now made to FIG. 3 wherein a preferred form of handle 18 is shown. The handle 18 is the same as handle 16 except that it additionally includes a spur 25 formed at the junction of each side leg 19 and the interconnecting leg 20. The spurs serve to pierce into the ground surface when the helper tray is used to rake up leaves 24 as shown in FIG. 4; and wherein the handle is surged outwardly so to form a leg for holding the helper tray in an upwardly inclined position for raking in the leaves without the necessity of a person to bend down and hold the tray in this utility position. As shown, the spurs 25 penetrate the ground surface so to prevent the tray from sliding backwardly when the rake brushes upon wall surface 11.

A strap unit 26 can be used to prevent the handle pivoting into a closed position by the rake force. The strap unit can consist simply of a cord, elastic or rubber band 27 secured at one end around leg 20, the other end of the band being connected to a metal hook 28 which can be quickly and easily snapped into a hole 29 formed on tab 14.

Reference is now made to FIG. 5 which shows still another design of handle 30 that is fully adjustable in inclination angle and length. The handle 30 includes U-shaped member 31 made of a formed stiff wire and which includes the above described side legs 19, interconnecting leg 20 and spurs 25. The end 32 of each leg 19 is inserted inside one end of a tube 33 that is bent into a right angle, and is adjustably secured therein by a set screw 34. In the opposite end of each tube 33 there is inserted one end of a stop member 35 and is adjustably secured therein by a set screw 36. Each stop member 35 is made of a right angle shaped stiff wire. The terminal projection 36 of stop member 35 serves the same purpose as the above described projection 23.

It is now evident that the handle 30 is readily adjustable in a range of inclined angles when supporting the tray as in FIG. 4, and the handle length can be extended so the tray inclination can be greater or less, as wished.

Thus different forms of the invention are provided.

While various changes may be made in the detail construction it is understood that such changes will be within the spirit and scope of the present invention as is defined by the appended claims.

What is claimed is:

1. A garden tray for removing trash, comprising a flat rectangular bottom, an upstanding back wall, opposite triangular side walls and a front edge provided at the juncture of the bottom and side walls, in combination with a handle pivotally mounted on the bottom wall exterior adapted to support the tray against the ground, said handle including spaced rotatable shafts parallel to the edge, said shafts provided with stops perpendicular to each shaft at one end and a U-shaped extending integrally at right angles from the other end of said shafts and disposed generally transversely relative to the stops, said handle including spaced spurs extending from said bail in a direction remote from said tray, said stops being disposed generally transversely relative to said spurs, whereby rotation of the shafts through a predetermined angle will cause the stops to bear against the bottom of the tray when the spurs and handle are disposed generally transversely to the tray bottom, thereby causing the spurs to transmit external downward pressure and pierce the supporting ground, a tab integral with an upper edge of said back wall rearwardly bent parallel and spaced from said back wall, an opening through said tab, and a strap unit affixed to said W-shaped bail detachably secured to said tab opening.

2. The combination as set forth in claim 1 wherein said handle is comprised of a generally U-shaped stiff wire member that includes said spurs formed therein, a pair of right angle shaped tubes each of which is adjustably secured at its one end upon each end of said U-shaped wire member by means of a set screw, and a right angle shaped stiff wire member being adjustably secured at its one end within an opposite end of each said tube by means of a set screw.

* * * * *